Patented Dec. 3, 1929

1,737,731

UNITED STATES PATENT OFFICE

MOSES ROGOVIN, OF NEW YORK, N. Y., ASSIGNOR, BY DIRECT AND MESNE ASSIGNMENTS, TO ROGSTONE CHEMICAL RESEARCH INC., OF NEW YORK, N. Y., A CORPORATION OF NEW YORK

METHOD OF DEODORIZING ANIMAL AND VEGETABLE OILS

No Drawing.   Application filed February 14, 1925.   Serial No. 9,353.

My invention relates to an improved method of deodorizing malodorous animal and vegetable oils and fats.

Several methods for deodorizing fish oil were heretofore proposed. According to one of these methods, the oil is boiled at a temperature of 300 degrees C. or higher by conducting superheated steam or neutral gases through the oil, catalyzers being used or dispensed with as determined by the judgment of the operator. By another method the oil is boiled in vacuum at a temperature of from 300 to 350 degrees C.

It developed in practice that certain disadvantages inhere in these methods, viz:— the viscosity and specific gravity of the oil increase; it becomes darker and undergoes too great a chemical change as indicated by a reduction in the iodine number, and lastly and perhaps most important of all, in many cases the objectionable odor returns after a comparatively short time.

I have found that the odor of even the most malodorous fish oil may be permanently eliminated by boiling the oil with water until the latter evaporates and thereafter increasing the temperature of the oil to remove any remaining trace of water. By this method of treatment the oil is completely freed of odor, and because of the relatively low temperature employed the viscosity and specific gravity of the oil do not change and its chemical characteristics remain substantially unaltered.

The method may be practiced in an open kettle having a hood placed thereover, or in a covered receptacle provided with an opening or outlet for the steam. The equipment may be of the simplest and most economical kind.

Following is an example of the manner in which the invention may be practiced:—One hundred gallons of fish oil and twenty gallons of water are slowly heated to the boiling temperature of the water, the mixture being constantly stirred during heating. The object of the invention is to successfully treat any oil whether crude or refined, because some refined oils, such as fish oils for example retain objectionable odors even after refinement, the object being to provide a method of deodorization of the full range of oils from the crudest to the most refined. The boiling is continued until the water evaporates and thereupon the temperature is raised for a brief period to from 115 to 120 degrees C. to drive off any remaining trace of water in the oil. If the method be practiced in a covered kettle or container, it is advisable to conduct a current of neutral gases C. G. carbonic acid gas or nitrogen gas over the surface of the boiling contents of the container for the purpose of accelerating the removal of the malodorous substances contained in the steam. The method just described is what may be termed a two-step method, in that the oil and water are first heated to the boiling temperature of the water; the boiling being continued for a period sufficiently long to permit the water to be carried off in steam, and thereafter the temperature is raised to drive off any remaining traces of water.

It is naturally intended that the generic term "oils" used herein, includes any organic fatty substances, such as animal fats, etc., which may be subjected to the present deodorizing process.

I claim:—

1. The herein described method of deodorizing malodorous animal and vegetable oils and fats comprising the addition of substantially twenty gallons of water to one hundred gallons of oil, slowly heating the mixture to the boiling point of water, the mixture being stirred during the process of heating, the heating being continued until the water is evaporated and the temperature is then increased to from 115° to 120° C. until the last trace of water is driven off.

2. In the method of deodorizing animal and vegetable oils and fats, the steps claimed in claim 1 and the additional step of passing a current of neutral gases over the surface of the boiling oil and water.

In testimony whereof I have affixed my signature.

MOSES ROGOVIN.